(12) United States Patent
Kim

(10) Patent No.: US 11,380,950 B2
(45) Date of Patent: Jul. 5, 2022

(54) BATTERY MODULE HAVING INITIAL PRESSING FORCE STRENGTHENING STRUCTURE FOR CELL ASSEMBLY, AND METHOD FOR MANUFACTURING SAME

(71) Applicant: LG Chem, Ltd., Seoul (KR)

(72) Inventor: Yong-Il Kim, Daejeon (KR)

(73) Assignee: LG Energy Solution, Ltd.

( * ) Notice: Subject to any disclaimer, the term of this patent is extended or adjusted under 35 U.S.C. 154(b) by 309 days.

(21) Appl. No.: 16/611,728

(22) PCT Filed: Oct. 10, 2018

(86) PCT No.: PCT/KR2018/011899
§ 371 (c)(1),
(2) Date: Nov. 7, 2019

(87) PCT Pub. No.: WO2019/107734
PCT Pub. Date: Jun. 6, 2019

(65) Prior Publication Data
US 2020/0106058 A1 Apr. 2, 2020

(30) Foreign Application Priority Data

Nov. 30, 2017 (KR) .......................... 10-2017-0162861

(51) Int. Cl.
*H01M 50/10* (2021.01)
*H01M 50/20* (2021.01)
*H01M 10/04* (2006.01)

(52) U.S. Cl.
CPC ........... *H01M 50/10* (2021.01); *H01M 50/20* (2021.01); *H01M 10/0481* (2013.01); *Y02E 60/10* (2013.01); *Y02P 70/50* (2015.11)

(58) Field of Classification Search
CPC .. H01M 10/0481; H01M 50/10; H01M 50/20; Y02E 60/10; Y02P 70/50
See application file for complete search history.

(56) References Cited

U.S. PATENT DOCUMENTS

| 6,087,036 A | 7/2000 | Rouillard et al. |
| 2008/0292913 A1 | 11/2008 | Hong et al. |

(Continued)

FOREIGN PATENT DOCUMENTS

| CN | 102208574 A | 10/2011 |
| CN | 104078628 A | 10/2014 |

(Continued)

OTHER PUBLICATIONS

International Search Report for Application No. PCT/KR2018/011899, dated Jan. 24, 2019, pp. 1-2.

(Continued)

*Primary Examiner* — Lingwen R Zeng
(74) *Attorney, Agent, or Firm* — Lerner, David, Littenberg, Krumholz & Mentlik, LLP

(57) ABSTRACT

A battery module includes a cell stack having pouch-type battery cells provided to stand side by side and stacked in a horizontal direction, and a module housing configured to accommodate the cell stack. The module housing includes a lower plate provided in a rectangular plate form to support the cell stack at a lower portion of the cell stack; and a first left pressing plate and a first right pressing plate having elasticity and extending upwards at both side edge regions of the lower plate, which are provided side by side, to form an acute angle with respect to a vertically upper direction so that a gap between the first left pressing plate and the first right pressing plate becomes narrowed upwards. The first left pressing plate and the first right pressing plate are elastically biased to press both side surfaces of the cell stack.

14 Claims, 7 Drawing Sheets

(56) References Cited

U.S. PATENT DOCUMENTS

| | | | |
|---|---|---|---|
| 2010/0122461 A1 | 5/2010 | Minas et al. | |
| 2011/0195285 A1* | 8/2011 | Shin | H01M 50/54 |
| | | | 429/93 |
| 2011/0262799 A1 | 10/2011 | Kim | |
| 2012/0088146 A1 | 4/2012 | Byun | |
| 2012/0114999 A1* | 5/2012 | Park | H01M 50/166 |
| | | | 429/99 |
| 2013/0078493 A1* | 3/2013 | Chen | H01M 10/0468 |
| | | | 429/96 |
| 2014/0212715 A1 | 7/2014 | Kim et al. | |
| 2014/0295235 A1 | 10/2014 | Jung | |
| 2015/0311482 A1 | 10/2015 | Byun | |
| 2017/0047562 A1 | 2/2017 | Ogawa et al. | |
| 2018/0047954 A1 | 2/2018 | Yoo et al. | |
| 2019/0006647 A1* | 1/2019 | Ryu | H01M 50/572 |
| 2019/0267591 A1 | 8/2019 | Park et al. | |

FOREIGN PATENT DOCUMENTS

| | | |
|---|---|---|
| CN | 110114906 A | 8/2019 |
| EP | 2659534 A2 | 11/2013 |
| EP | 3131133 A1 | 2/2017 |
| JP | S5535785 U | 3/1980 |
| JP | 2001511594 A | 8/2001 |
| JP | 200999383 A | 5/2009 |
| JP | 2009182001 A | 8/2009 |
| JP | 2013089566 A | 5/2013 |
| JP | 201478498 A | 5/2014 |
| JP | 2016143443 A | 8/2016 |
| JP | 201737789 A | 2/2017 |
| JP | 2020501320 A | 1/2020 |
| KR | 101108192 B1 | 2/2012 |
| KR | 20120036743 A | 4/2012 |
| KR | 20130114623 A | 10/2013 |
| KR | 20140098490 A | 8/2014 |
| KR | 20150122463 A | 11/2015 |
| WO | 2016204489 A1 | 12/2016 |

OTHER PUBLICATIONS

Extended European Search Report with Written Opinion for Application No. 18882705.9 dated Jun. 25, 2020, 6 pages.
Chinese Search Report for Application No. 201880049774.X dated Dec. 14, 2021, 3 pages.

* cited by examiner

FIG. 5
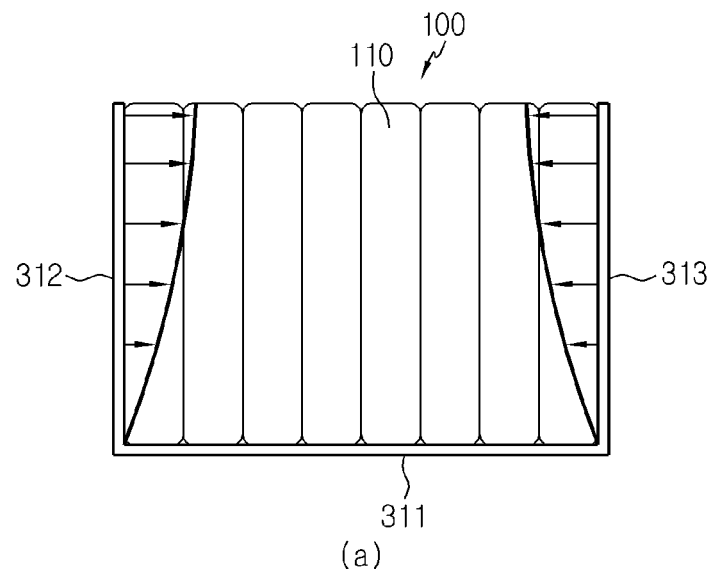
(a)
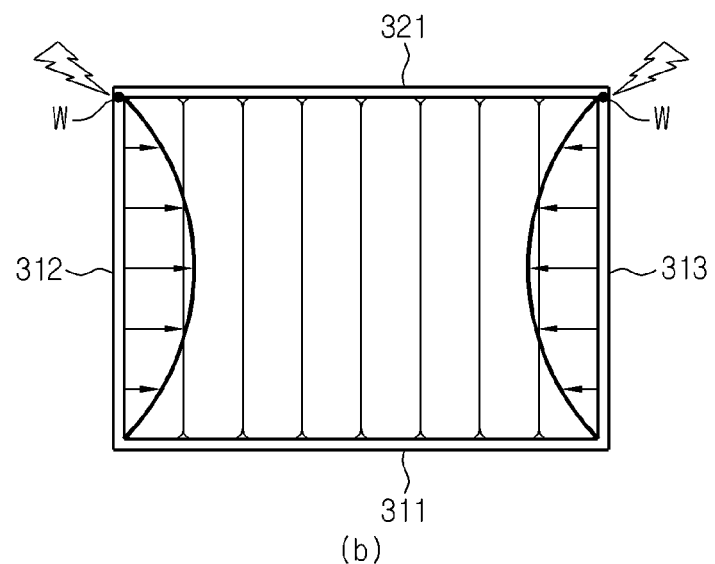
(b)

FIG. 7
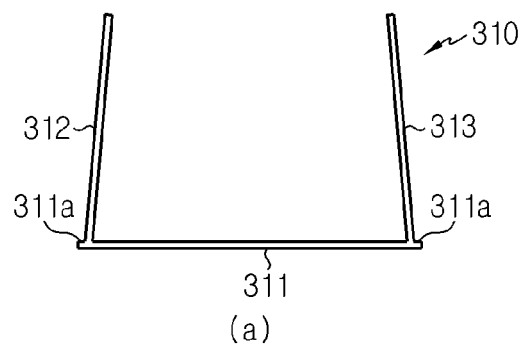
(a)
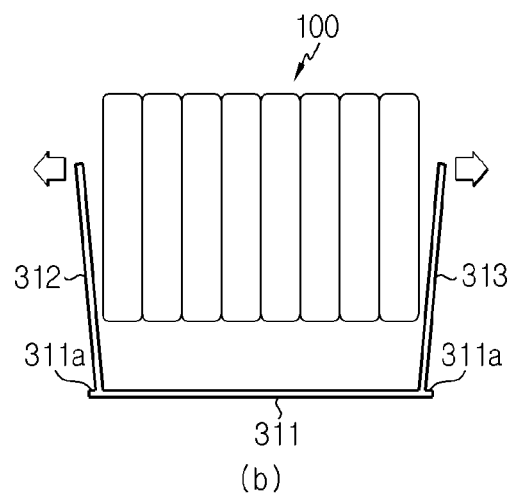
(b)
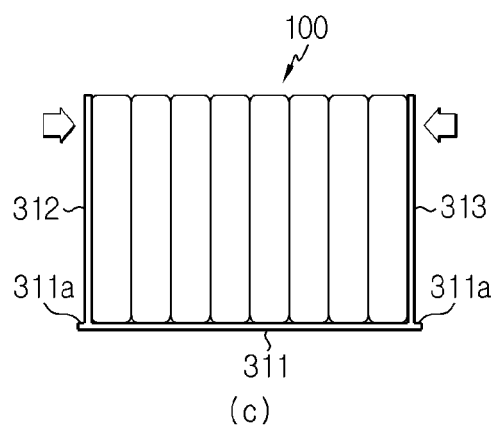
(c)

BATTERY MODULE HAVING INITIAL PRESSING FORCE STRENGTHENING STRUCTURE FOR CELL ASSEMBLY, AND METHOD FOR MANUFACTURING SAME

CROSS-REFERENCE TO RELATED APPLICATION

The present application is a national phase entry under 35 U.S.C. § 371 of International Application No. PCT/KR2018/011899, filed Oct. 10, 2018, published in Korean, which claims priority to Korean Patent Application No. 10-2017-0162861 filed on Nov. 30, 2017, the disclosures of which are incorporated herein by reference.

TECHNICAL FIELD

The present disclosure relates to a battery module and a method of manufacturing the battery module, and more particularly, to a battery module having a module housing capable of compressing a cell assembly and a method of manufacturing the battery module.

BACKGROUND ART

Secondary batteries widely used at the preset include lithium ion batteries, lithium polymer batteries, nickel cadmium batteries, nickel hydrogen batteries, nickel zinc batteries and the like. An operating voltage of such a unit secondary battery cell is about 2.5V to 4.2V. Therefore, if a higher output voltage is required, a plurality of battery cells may be connected in series. Alternatively, depending on the charge/discharge capacity, a plurality of battery cells may be connected in series and in parallel to configure a battery module.

When a plurality of secondary battery cells are connected in series and/or in parallel to constitute a middle-sized or large-sized battery module, lithium-polymer pouch-type secondary battery cells having a high energy density and allowing easy stacking are frequently used, and the lithium-polymer pouch-type secondary battery cells are stacked to configure a cell assembly. After that, the cell assembly is packaged using a module housing for protection, and electric components for electrically connecting the secondary battery cells and measuring voltages thereof are added to configure a battery module.

However, in the lithium-polymer pouch-type secondary battery, an electrode assembly is generally included in an aluminum laminate sheet, and thus the energy density is high in spite of a small size and weight, but the mechanical stiffness is weak. In particular, in the lithium-polymer pouch-type secondary batteries, the electrode may become thicker during repetitive charging/discharging processes, or gas may be generated due to decomposition of an internal electrolyte caused by side reactions. At this time, the pouch-type secondary battery cell may be swelled due to electrode expansion and/or gas generation, generated gas, which is called a 'swelling phenomenon'. For reference, the swelling phenomenon is more seriously influenced by the factor subordinate to the electrode expansion in charging and discharging.

If the swelling phenomenon of the pouch-type secondary battery cell becomes intensified, the performance of the secondary battery cell may deteriorate, and the outer shape of the module housing may be changed, which may give an adverse effect to the structural stability of the battery module.

According to the studies until now, it is known that the thickness expansion due to swelling is relatively small when the stacked secondary battery cells are strongly compressed from the early assembling state. Among the swelling phenomenon prevention technologies, there is known a technique of dispersing an expansion force by inserting a compression pad between secondary battery cells and, for example, a compressing technique by tightening a battery module with straps as disclosed in JP Unexamined Patent Publication No. 2013-089566.

However, if the compression pad is used, the space for accommodating secondary battery cells is reduced as much as the volume of the compression pad, which is disadvantageous in terms of energy density per unit volume of the battery module. Also, if the strap is used, the pressure is irregularly applied to a region tightened by the strap and a region not tightened, and a strap assembling process is further required and the number of components increase. Thus, it is demanded to develop a battery module having an assembling structure capable of solving these problems.

DISCLOSURE

Technical Problem

The present disclosure is designed to solve the problems of the related art, and therefore the present disclosure is directed to providing a battery module, which may accommodate battery cells in a pressurized state without using a separate component, and a method of manufacturing the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, which includes a cell stack having pouch-type battery cells provided to stand side by side and stacked in a horizontal direction, and a module housing configured to accommodate the cell stack, wherein the module housing includes: a lower plate provided in a rectangular plate form to support the cell stack at a lower portion of the cell stack; and a first left pressing plate and a first right pressing plate having elasticity and extending upwards at both side edge regions of the lower plate, which are provided side by side, to form an acute angle with respect to a vertically upper direction so that a gap between the first left pressing plate and the first right pressing plate becomes narrowed upwards, wherein the first left pressing plate and the first right pressing plate are elastically biased to press both side surfaces of the cell stack.

The module housing may further include an upper plate coupled to upper ends of the first left pressing plate and the first right pressing plate by welding or bolting to cover an upper portion of the cell stack.

The module housing may further include an upper plate provided in a rectangular plate form to cover an upper portion of the cell stack at the upper portion of the cell stack; a second left pressing plate and a second right pressing plate having elasticity and extending downwards respectively at both side edge regions of the upper plate so that the second left pressing plate is elastically biased to be closely adhered to an outer surface of the first left pressing plate and the second right pressing plate is elastically biased to be closely adhered to an outer surface of the first right pressing plate.

The first left pressing plate and the first right pressing plate may be formed to extend upwards at inner locations from terminal ends of the lower plate by a predetermined distance so that the second left pressing plate and the second right pressing plate are located inward from the terminal ends of the lower plate.

Lower ends of the second left pressing plate and the second right pressing plate may be welded to an upper surface of the lower plate.

In another aspect of the present disclosure, there is also provided a method of manufacturing a battery module, comprising: preparing a first module housing, which includes a lower plate having a rectangular plate form and a first left pressing plate and a first right pressing plate having elasticity and extending upwards at both side edge regions of the lower plate, which are provided side by side, to form an acute angle with respect to a vertical direction so that a gap between the first left pressing plate and the first right pressing plate becomes narrowed upwards, and a cell stack that is to be accommodated in the first module housing; and pulling the first left pressing plate and the first right pressing plate apart within an elastic limit to broaden the gap therebetween, then inserting the cell stack into the first module housing, and releasing the first left pressing plate and first right pressing plate to press both side surfaces of the cell stack.

The method may further comprise coupling an upper plate to upper ends of the first left pressing plate and first right pressing plate by welding or bolting.

Also, in another aspect of the present disclosure, the method may further comprise preparing a second module housing, which includes an upper plate having a rectangular plate form and a second left pressing plate and a second right pressing plate having elasticity and extending downwards respectively at both side edge regions of the upper plate, which are provided side by side, to form an acute angle with respect to a vertically lower direction so that a gap between the second left pressing plate and the second right pressing plate becomes narrowed downwards; and pulling the second left pressing plate and second right pressing plate apart within an elastic limit to place the upper plate on upper ends of the first left pressing plate and the first right pressing plate, and then releasing the second left pressing plate and the second right pressing plate to press the first left pressing plate and the first right pressing plate.

The method may further comprise coupling lower ends of the second left pressing plate and the second right pressing plate to the first module housing by welding or bolting.

Advantageous Effects

According to an embodiment of the present disclosure, battery cells may be accommodated in a module housing in a pressurized state without using any separate component. Since the battery cells are accommodated in the module housing in a strongly pressurized state at an initial stage, it is possible to suppress the volume expansion during charging and discharging.

According to another embodiment of the present disclosure, since a separate component is not needed to press the battery cells, it is possible to reduce the manufacturing cost.

According to still another embodiment of the present disclosure, since the number of places where welding or fastening is required in assembling the module housing is minimized, it is possible to simplify the assembly process.

DESCRIPTION OF DRAWINGS

FIGS. 4 and 5 are diagrams for illustrating each step of manufacturing a battery module according to an embodiment of the present disclosure.

FIGS. 7 and 8 are diagrams for illustrating each step of manufacturing a battery module according to another embodiment of the present disclosure.

BEST MODE

Figure 1:
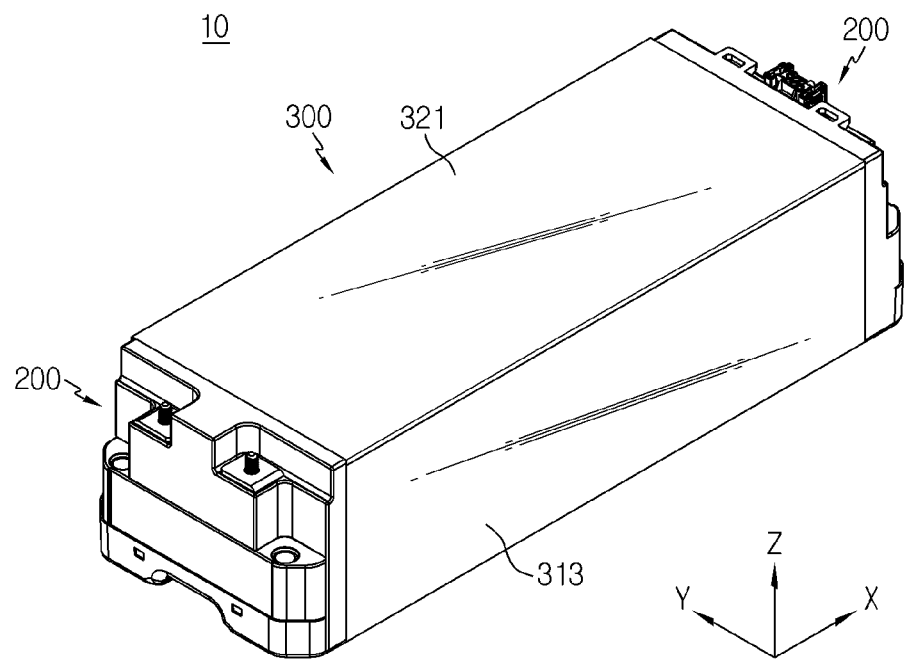
FIG. 1 is a perspective view showing a battery module according to an embodiment of the present disclosure.

The embodiments disclosed herein are provided for more perfect explanation of the present disclosure, and thus the shape, size and the like of components may be exaggerated, omitted or simplified in the drawings for better understanding. Thus, the size and ratio of components in the drawings do not wholly reflect the actual size and ratio.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 2:
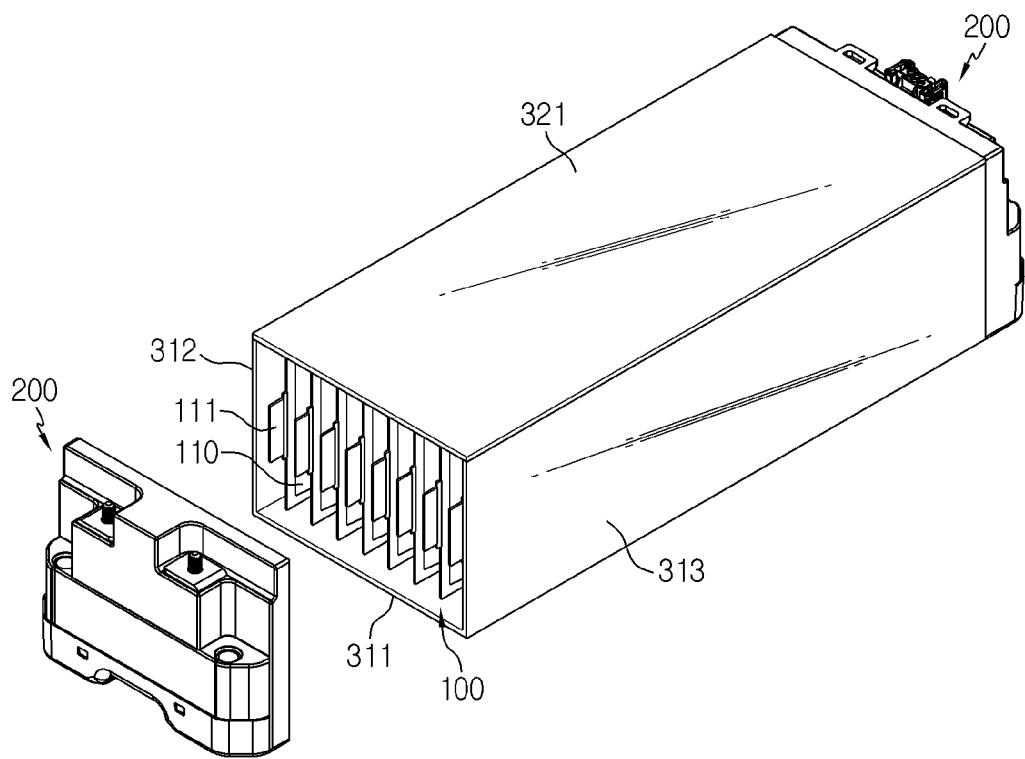
FIG. 2 is a perspective view showing that a sensing assembly is separated from the battery module of FIG. 1.

FIG. 1 is a perspective view showing a battery module according to an embodiment of the present disclosure, and FIG. 2 is a perspective view showing that a sensing assembly is separated from the battery module of FIG. 1.

Referring to FIGS. 1 and 2, a battery module 10 according to an embodiment of the present disclosure may include a cell stack 100, a sensing assembly 200, and a module housing 300.

The cell stack 100 may be an aggregate of secondary batteries, which includes pouch-type battery cells 110 stacked so that their large surfaces face each other. In more detail, the cell stack 100 of the present disclosure may be an aggregate of secondary batteries accommodated in the module housing 300 so that the pouch-type battery cells 110 are provided to stand side by side and stacked in a horizontal direction.

Here, the pouch-type battery cells 110 means a secondary battery, which includes a pouch exterior, an electrode assembly provided to be accommodated in the pouch exterior, and an electrolyte. For example, the pouch-type exterior may include two pouches, at least one of which may have a concave inner space. In addition, the electrode assembly may be accommodated in the inner space of the pouch. Peripheries of two pouches are fused together so that the inner space accommodating the electrode assembly may be sealed.

An electrode lead 111 may be attached to the electrode assembly, and the electrode lead 111 may be interposed between the fused portions of the pouch exterior and exposed out of the pouch exterior to function as an electrode terminal of the battery cell 110.

Though not shown in the figures for convenience, the sensing assembly 200 may include a plurality of bus bars, a printed circuit board to which one ends of the bus bars are connected, and a housing of the sensing assembly 200 giving a place for integrally fixing the bus bars and the printed circuit board and formed to cover the opening of the module housing 300.

The bus bars are made of electrically conductive metals such as copper or aluminum to serve as a current path and may be connected in series and/or in parallel to the electrode leads 111 of the battery cells 110. One set of ends of the plurality of bus bars may be connected to the printed circuit board. On the printed circuit board, components such as a circuit chip for measuring the voltage of the individual battery cell 110 and a connector for transmitting or receiving signals to/from an external device may be provided.

The sensing assembly 200 may be connected to a battery management system (BMS) to provide voltage information of the battery cell 110 to the BMS. The BMS may control the operation of the battery cells 110 such as charging or discharging based on the voltage information.

The module housing 300 has an inner space capable of accommodating the battery cells 110 therein and plays a role of giving a mechanical support for the accommodated battery cells 110 and protecting the battery cells 110 from external impacts. Thus, the module housing 300 may be made of a metal material to secure rigidity. However, the module housing 300 of the present disclosure is not limited to a metal housing. For example, the module housing 300 may be made of any material such as a non-metallic material as long as it has a predetermined elasticity.

As shown in FIG. 2, the module housing 300 according to an embodiment of the present disclosure may include a first module housing 310 and an upper plate 321.

As will be explained in more detail later, in this embodiment, the first module housing 310 may compress the cell stack 100, so the amount of swelling of the battery cells 110 during charging and discharging may be lowered without using a compression component such as a conventional strap. In addition, a compression pad conventionally interposed between the battery cells 110 may be not used, and thus the energy density of the battery module 10 may be improved. If required, it is also possible to add the conventional strap and the compression pad to the module housing 300 of the present disclosure to further increase the compression force to the battery cells 110.

Figure 3:
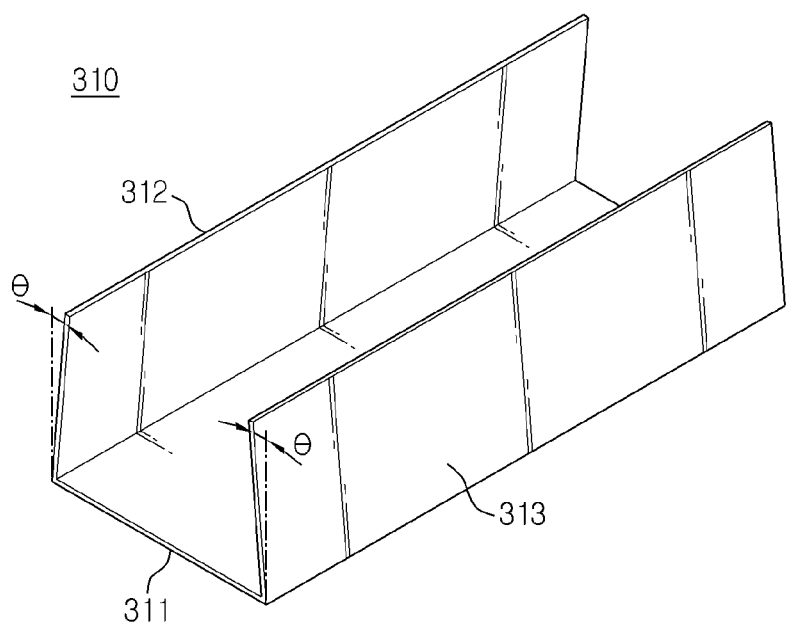
FIG. 3 is a perspective view showing a first module housing according to an embodiment of the present disclosure.

The first module housing 310 of this embodiment will be described in detail with reference to FIG. 3. The first module housing 310 may include a lower plate 311, a first left pressing plate 312 and a first right pressing plate 313. However, the lower plate 311, the first left pressing plate 312 and the first right pressing plate 313 of the first module housing 310 are conceptually distinguished, and these plates may be also formed integrally.

The lower plate 311 has a rectangular plate form with a predetermined area and serves to support the cell stack 100 at a lower portion of the cell stack 100. Here, the predetermined area may be an area (L×T) corresponding to the product of a length (L) of the battery cell 110 and a thickness (T) of all the battery cells 110 of the cell stack 100.

The first left pressing plate 312 and the first right pressing plate 313 form walls of the module housing 300 and may be provided corresponding to both side surfaces of the cell stack 100.

The first left pressing plate 312 and the first right pressing plate 313 may extend upwards at the both side edge regions of the lower plate 311, which are provided side by side. Here, both side edge regions correspond to long sides of the lower plate 311 and may almost coincide with the length of the battery cell 110.

In particular, the first module housing 310 according to the present disclosure may be made of a metal with elasticity, and the first left pressing plate 312 and the first right pressing plate 313 may be formed to be narrowed at a predetermined angle (θ) toward the inside of the lower plate 311.

In other words, the first left pressing plate 312 and the first right pressing plate 313 may extend upwards at both side edge regions of the lower plate 311 to form an acute angle (θ) with respect to a vertically upper direction so that a gap between the first left pressing plate 312 and the first right pressing plate 313 becomes narrowed upwards.

Since the first module housing 310 has elasticity, if the first left pressing plate 312 and the first right pressing plate 313 are pulled and then released, the first left pressing plate 312 and the first right pressing plate 313 may be restored to their original state. At this time, the elastic restoring forces of the first left pressing plate 312 and the first right pressing plate 313 act as a force for compressing both side surfaces of the cell stack 100.

The upper plate 321 has a rectangular plate form to cover an upper portion of the cell stack 100 and may have an area corresponding to the lower plate 311. The upper plate 321 may be coupled to upper ends of the first left pressing plate 312 and the first right pressing plate 313 by welding or bolting.

Thus, the module housing 300 of this embodiment may be provided in a rectangular tube form as the first module housing 310 and the upper plate 321 are coupled.

Hereinafter, a method of manufacturing the battery module 10 according to the present disclosure using the module housing 300 configured as above will be described in more detail.

Figure 4:
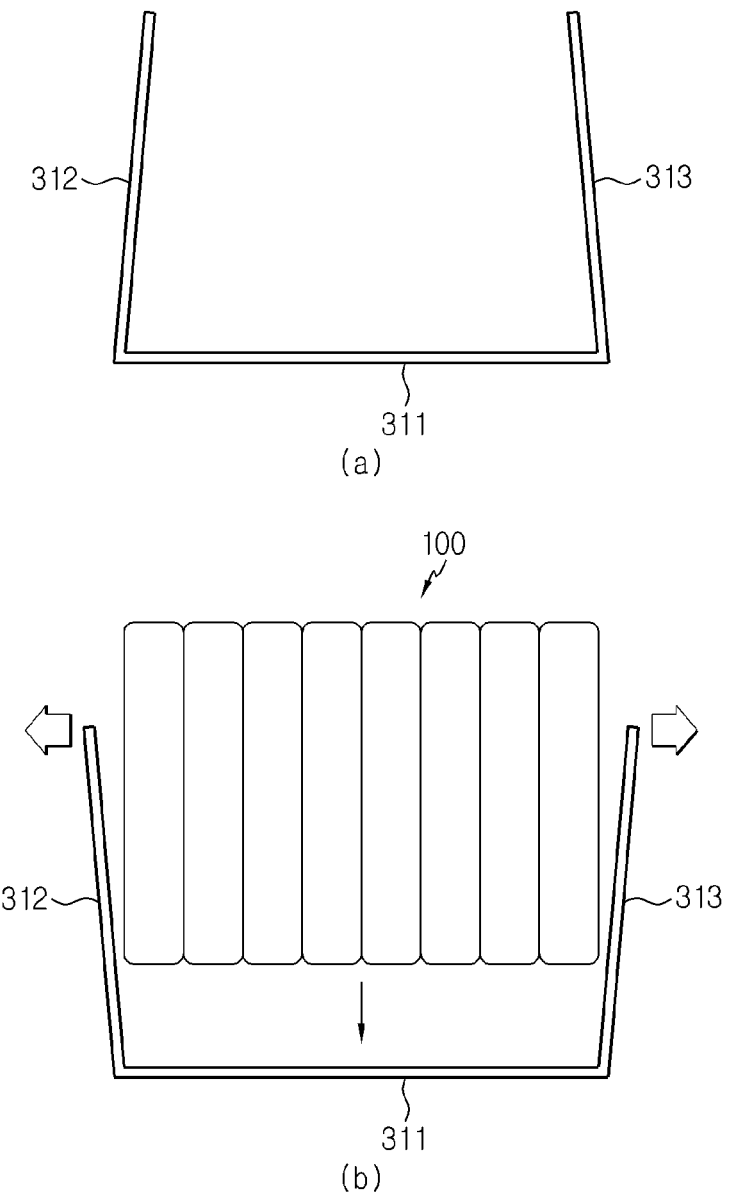
Figure 6:
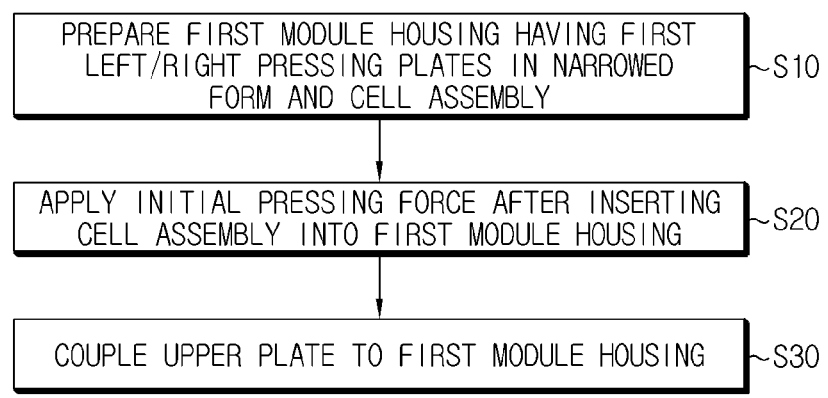
FIG. 6 is a flowchart for illustrating a method of manufacturing a battery module according to an embodiment of the present disclosure.

FIGS. 4 and 5 are diagrams for illustrating each step of manufacturing a battery module 10 according to an embodiment of the present disclosure, and FIG. 6 is a flowchart for illustrating a method of manufacturing a battery module 10 according to an embodiment of the present disclosure.

The method of manufacturing the battery module 10 according to the present disclosure may include providing a first module housing 310, an upper plate 321, and a cell stack 100 to be accommodated in the first module housing 310 (S10), and inserting the cell stack 100 into the first module housing 310 and then pressing the cell stack 100 (S20).

First, a first metal housing 310 is formed by shaping a metal plate with elasticity. At this time, as described above, the first module housing 310 is configured so that the first left pressing plate 312 and the first right pressing plate 313 are slightly narrowed toward the inside of the lower plate 311. In addition, the cell stack 100 is prepared by stacking as many pouch-type battery cells 110 as can be accommodated in the first module housing 310.

The lower plate 311 of the first module housing 310 has a width corresponding to the thickness of all the battery cells 110 of the cell stack 100. In other words, the cell stack 100 is prepared by stacking a predetermined number of pouch-type battery cells 110 in a lateral direction in a standing state, and the lower plate 311 is provided such that its width is substantially equal to the total thickness of the predetermined number of pouch-type battery cells 110.

For example, the cell stack 100 of this embodiment is configured by stacking eight pouch-type battery cells 110 in total in the lateral direction, and the width of the lower plate 311 of the first module housing 310 is designed to have a size corresponding to the total thickness of eight pouch-type battery cells 110.

After that, as shown in FIG. 4, the first left pressing plate 312 and the first right pressing plate 313 are pulled apart to broaden the gap therebetween so as to make a space into which the cell stack 100 may be inserted, and then the cell stack 100 is inserted into the inner space of the first module housing 310.

After that, if the first left pressing plate 312 and the first right pressing plate 313 are released, as shown in the portion (a) of FIG. 5, the first left pressing plate 312 and the first right pressing plate 313 are narrowed to compress both side surfaces of the cell stack 100.

Since the battery cells 110 are constrained in the inner space of the first module housing 310 in an initially pressurized state, it is possible to securely fix the battery cells 110 and to suppress the thickness expansion caused by swelling during charging and discharging.

After that, the upper plate 321 is attached to the upper ends of the first left pressing plate 312 and the first right pressing plate 313 by welding (S30). For example, as shown in the portion (b) of FIG. 5, both side edge regions of the upper plate 321 are placed on the upper ends of the first left pressing plate 312 and the first right pressing plate 313, and then welding (W) may be performed to their contact portions to cover the upper portion of the cell stack 100.

The upper plate 321 may cover the upper portion of the cell stack 100 and also hold the first left pressing plate 312 and the first right pressing plate 313 so that the gap between the first left pressing plate 312 and the first right pressing plate 313 may be consistently maintained in a state where an initial pressing force is applied to the cell stack 100.

The module housing 300 of this embodiment prepared as above may be finally provided in a tubular form. The electrode leads 111 of the battery cells 110 may be exposed to the outside through an open front surface and an open rear surface of the module housing 300, and bus bars may be electrically connected to the electrode leads 111 111 by, for example, ultrasonic welding. After that, the housing of the sensing assembly 200 is mounted to the front surface and the rear surface of the module housing 300 to completely package the cell stack 100.

Subsequently, a battery module 10 according to other embodiments of the present disclosure will be described. The same reference sign as in the former embodiment designates the same component. The same component will not described again, and features different from the former embodiment will be described in detail.

Figure 8:
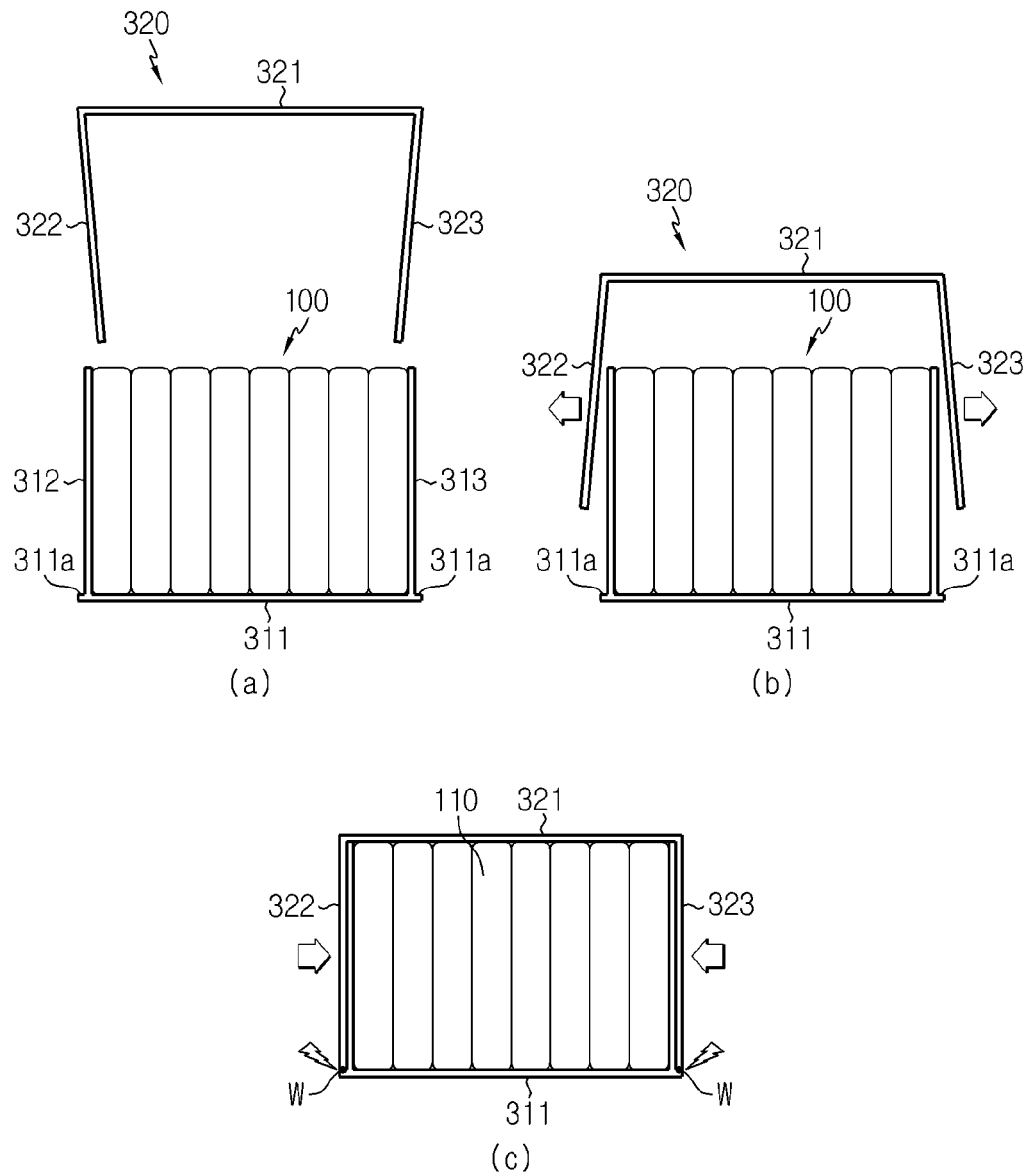

FIGS. 7 and 8 are diagrams for illustrating each step of manufacturing a battery module 10 according to another embodiment of the present disclosure.

The battery module 10 according to another embodiment of the present disclosure further includes a second module housing 320 as compared to the former embodiment, which may further reinforce the initial pressing force to the cell stack 100 and improve the convenience in assembling.

The second module housing 320 may be configured to compress the first left pressing plate 312 and the first right pressing plate 313 so that the first module housing 310 is covered. The second module housing 320 may include an upper plate 321, a second left pressing plate 322 and a second right pressing plate 323. The upper plate 321, the second left pressing plate 322 and the second right pressing plate 323 of the second module housing 320 are conceptually distinguished, and these three plates may also be integrally formed using an elastic metal material, similar to the first module housing 310.

The upper plate 321 has a rectangular plate form and may be provided to cover an upper portion of the cell stack 100 at the upper portion of the cell stack 100. The second left pressing plate 322 and the second right pressing plate 323 may be provided to be narrowed at a predetermined angle toward the inside of the upper plate 321.

That is, the second left pressing plate 322 and the second right pressing plate 323 may extend downwards at the both side edge regions of the upper plate 321, which are provided side by side, to form an acute angle with respect to a vertically lower direction, respectively.

If the second left pressing plate 322 and the second right pressing plate 323 of the second module housing 320 are pulled apart within an elastic limit and then released, the second left pressing plate 322 and the second right pressing plate 323 may be restored to their original narrowed state, similar to the first left pressing plate 312 and the first right pressing plate 313 of the first module housing 310 described above.

Thus, as shown in FIG. 8, if the second left pressing plate 322 and the second right pressing plate 323 of the second module housing 320 are pulled apart to cover the first module housing 310 and then released, the second left pressing plate 322 may be elastically biased toward the first left pressing plate 312 to be closely adhered thereto, and the second right pressing plate 323 may be elastically biased toward the first right pressing plate 313 to be closely adhered thereto.

The method of manufacturing the battery module 10 including the second module housing 320 is identical to the method of the former embodiment through the step of pressing the cell stack 100 to the first module housing 310, as shown in FIG. 7. After that, the second left pressing plate 322 and the second right pressing plate 323 are pulled apart within an elastic limit to broaden the gap therebetween so that the upper plate 321 comes into contact with the upper ends of the first left pressing plate 312 and the first right pressing plate 313, and then the second left pressing plate 322 and the second right pressing plate 323 are released to press the first left pressing plate 312 and the first right pressing plate 313, different from the former embodiment.

In this case, the compression force applied to the cell stack 100 may be doubled by adding the compression force of the first left and right pressing plates 312, 313 to the compression force of the second left and right pressing plates 322, 323. As a result, the force for compressing the expansion of the battery cells 110 may be further strengthened as compared to the former embodiment.

Also, in this embodiment, the first left pressing plate 312 and the first right pressing plate 313 may extend upwards at inner locations from terminal ends of the lower plate 311 by a predetermined distance so that the second left pressing plate 322 and the second right pressing plate 323 are located inward from the terminal ends of the lower plate 311. Accordingly, both side terminal ends of the lower plate 311 are exposed to the outside based on the first left pressing plate 312 and the first right pressing plate 313. Hereinafter, both side terminal ends of the lower plate 311 will be referred to as welding spots 311a.

After the second module housing 320 is provided to cover the first module housing 310 as described above, as shown in the portion (c) of FIG. 8, the lower ends of the second left pressing plate 322 and the second right pressing plate 323 may be welded (W) to the welding spots 311a of the lower plate 311.

In the former embodiment, when the upper plate 321 is placed on the upper ends of the first left pressing plate 312 and the first right pressing plate 313 and the welding is performed, the position of the upper plate 321 may be changed even by a slight impact during the welding process, and thus a jig is separately used to hold the position of the upper plate 321.

Meanwhile, in this embodiment, since the second module housing 320 strongly compresses the first module housing 310, the lower ends of the second left and right pressing plates 322, 323 do not move relative to the welding spots 311a, and thus the welding process may be performed more easily.

The second left and right pressing plates 322, 323 may also be coupled to the first left and right pressing plates 312, 313 or the lower plate 311 of the first module housing 310 by bolting. For reference, since the module housing 300 of this embodiment is configured so that the first module housing 310 is surrounded and compressed by the second module housing 320, it is also possible to omit the welding or bolting.

If the battery module 10 having the configuration and action according to the present disclosure and its manufacturing method are used, the battery cells 110 may be accommodated in the module housing 300 in an initial pressurized state without using a separate component, and thus it is possible to suppress the volume expansion of the battery cells 110 during charging and discharging. In addition, since places required for welding or fastening in assembling the module housing 300 may be minimized, it is possible to simplify the assembling process.

Meanwhile, the battery module 10 may further include various devices (not shown) for controlling charge and discharge of the battery cells, such as a battery management system (BMS), a current sensor, a fuse, and the like. The battery module may also be used as an energy source for electric vehicles, hybrid electric vehicles or power storage systems.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left and right directions are used in the specification, it is obvious to those skilled in the art that these merely represent relative locations for convenience in explanation and may vary based on a location of an observer or an object to be observed.

What is claimed is:

1. A battery module, which includes a cell stack having pouch-type battery cells provided to stand side by side and stacked in a horizontal direction, and a module housing configured to accommodate the cell stack,
wherein the module housing includes:
a lower plate provided in a rectangular plate form to support the cell stack at a lower portion of the cell stack; and
a first left pressing plate and a first right pressing plate having elasticity and extending upwards at both side edge regions of the lower plate, which are provided side by side, to form an acute angle with respect to a vertically upper direction so that a gap between the first left pressing plate and the first right pressing plate becomes narrowed upwards,
wherein the first left pressing plate and the first right pressing plate are elastically biased to press both side surfaces of the cell stack,
wherein the module housing further includes:
an upper plate provided in a rectangular plate form to cover an upper portion of the cell stack at the upper portion of the cell stack;
a second left pressing plate and a second right pressing plate having elasticity and extending downwards respectively at both side edge regions of the upper plate so that the second left pressing plate is elastically biased to be closely adhered to an outer surface of the first left pressing plate and the second right pressing plate is elastically biased to be closely adhered to an outer surface of the first right pressing plate.

2. The battery module according to claim 1,
wherein the first left pressing plate and the first right pressing plate are formed to extend upwards at inner locations from terminal ends of the lower plate by a predetermined distance so that the second left pressing plate and the second right pressing plate are located inward from the terminal ends of the lower plate.

3. The battery module according to claim 2,
wherein lower ends of the second left pressing plate and the second right pressing plate are welded to an upper surface of the lower plate.

4. A method of manufacturing a battery module, comprising:
preparing a first module housing, which includes a lower plate having a rectangular plate form and a first left pressing plate and a first right pressing plate having elasticity and extending upwards at both side edge regions of the lower plate, which are provided side by side, to form an acute angle with respect to a vertical direction so that a gap between the first left pressing plate and the first right pressing plate becomes narrowed upwards, and a cell stack that is to be accommodated in the first module housing;
pulling the first left pressing plate and the first right pressing plate apart within an elastic limit to broaden the gap therebetween, then inserting the cell stack into the first module housing, and releasing the first left pressing plate and first right pressing plate to press both side surfaces of the cell stack;
preparing a second module housing, which includes an upper plate having a rectangular plate form and a second left pressing plate and a second right pressing plate having elasticity and extending downwards respectively at both side edge regions of the upper plate, which are provided side by side, to form an acute angle with respect to a vertically lower direction so that a gap between the second left pressing plate and the second right pressing plate becomes narrowed downwards; and
pulling the second left pressing plate and second right pressing plate apart within an elastic limit to place the upper plate on upper ends of the first left pressing plate and the first right pressing plate, and then releasing the second left pressing plate and the second right pressing plate to press the first left pressing plate and the first right pressing plate.

5. The method of manufacturing a battery module according to claim 4, further comprising:
coupling lower ends of the second left pressing plate and the second right pressing plate to the first module housing by welding.

6. The method of manufacturing a battery module according to claim 5, wherein the step of coupling the lower ends of the second left pressing plate and the second right pressing plate includes welding the lower ends of the second left pressing plate and the second right pressing plate to an upper surface of the lower plate.

7. The method of manufacturing a battery module according to claim 4, further comprising:
coupling lower ends of the second left pressing plate and the second right pressing plate to the first module housing by bolting.

8. The battery module according to claim 1, further comprising a sensing assembly connected to electrode leads of the battery cells.

9. The method of manufacturing a battery module according to claim 4, further comprising:
mounting a sensing assembly to a front surface and a rear surface of the module housing.

10. The battery module according to claim 1, wherein the module housing is made of a metal material.

11. The battery module according to claim 1, wherein the module housing is made of a non-metallic material.

12. An electric vehicle including the battery module according to claim 1 as an energy source.

13. A hybrid electric vehicle including the battery module according to claim 1 as an energy source.

14. A power storage system including the battery module according to claim 1 as an energy source.

\* \* \* \* \*